United States Patent
Gotham et al.

[11] 3,924,908
[45] Dec. 9, 1975

[54] ROLLER WITH INSERTED BALL BEARINGS

[75] Inventors: Robert W. Gotham; Robert J. McKnight, both of Toms River, N.J.

[73] Assignee: Unex Conveying Systems, Inc., Toms River, N.J.

[22] Filed: Dec. 7, 1973

[21] Appl. No.: 422,794

[52] U.S. Cl. .................. 308/20; 308/191; 308/195
[51] Int. Cl.[2] ......................................... F16C 33/58
[58] Field of Search ............ 308/DIG. 7, DIG. 8, 18, 308/20, 190, 191, 193, 195, 196; 193/37

[56] References Cited
UNITED STATES PATENTS

| | | | |
|---|---|---|---|
| 2,768,725 | 10/1956 | Foulds et al. | 308/190 |
| 2,886,156 | 5/1959 | Halbron | 193/37 |
| 3,304,138 | 2/1967 | Sampatacos | 308/195 |
| 3,606,502 | 9/1971 | Germond | 308/196 |

FOREIGN PATENTS OR APPLICATIONS

| | | | |
|---|---|---|---|
| 1,370,774 | 7/1964 | France | 308/20 |

*Primary Examiner*—Evon C. Blunk
*Assistant Examiner*—Robert Saifer

[57] ABSTRACT

A tubular roller with inserted ball bearings, each of said ball bearings including: a generally tubular plastic outer shell or housing containing at least one internal annular groove into which is inserted at least one circular ring, preferably metallic, to serve as the outer raceway; a hub which may be of plastic material with at least one external annular groove with one or more rings, preferably metallic, contained therein to serve as the inner raceway; and a full complement of balls, preferably metallic, between the two raceways.

4 Claims, 5 Drawing Figures

ROLLER WITH INSERTED BALL BEARINGS

SETTING AND OBJECTS OF THE INVENTION

This invention relates to ball-bearing rollers and more particularly to the low cost type in which cartridge-type ball bearings are pressed into both ends of a tube.

This invention also relates to ball bearings of the composite type, the elements of which are made of different materials, such as plastic and steel.

It is an object of this invention to provide a roller with ball bearings which can be press-fitted into the ends of a tube without the necessity of providing machined seats in the tube.

It is a further object of this invention to provide a composite ball bearing made substantially of plastic parts with raceway inserts of harder materials, preferably metallic, so that operational friction is minimal.

It is a still further object of this invention to provide an inexpensive ball bearing which can be washed or steam cleaned without damage to the bearing.

BACKGROUND OF THE INVENTION WITH REFERENCE TO PRIOR ART

Low-cost ball bearings used in tubular rollers are usually made of metal, most commonly carbon steel, and consist basically of an outer shell, an inner hub, and a full complement of balls.

The outer shells has an internal annular groove which serves as the outer ball raceway and usually consists of a generally tubular piece of solid metal with a groove or ball raceway milled into the inner surface, or it may consist of two or more parts assembled into a unit, in some cases in a housing which holds the parts together in a fixed relationship one to the other. Because the parts are made by machining or stamping operations, it is possible to hold the outer diameter to the required dimension within very close tolerances. However, it is much more difficult and costly to hold the roller tubing to the desired dimensions with the result that it is often necessary to machine the seats in the ends of the tubing to avoid excessive rejects in the finished product. Molded plastic outer shells have been used, but have proven deficient in three respects: (1) balls do not roll freely against the plastic material, thus increasing the coefficient of friction substantially; (2) plastic raceways are subject to "cold flow" which is especially evident when stationary loads are imposed for prolonged periods causing the balls to indent the raceways; (3) shock loads applied at the ends of rollers can deform the roller tubes, this deformation being transferred to the outer raceway causing seizure of the balls and consequent mal-functioning of the bearings.

Plastic housings could be made with metallic raceways inserted in the molds and plastic material thereafter injected in the molds to contain and hold the raceways in position, but this process would be very expensive, and wasteful if rejects become excessive.

The hub is usually made of a single piece of metal with an annular groove milled in the outer surface, but it also has sometimes been made of several separate parts so that the groove is split to permit insertion of the balls in the assembly process, the separate parts being held in place in various ways. Hubs have been made of plastic materials but suffer deficiencies similar to those heretofore mentioned for plastic outer shells.

An additional problem encountered with most ball bearings is that, if made of carbon steel, they are subject to corrosion and cannot be used where equipment must be "sanitized" as by steam cleaning which results in rapid corrosion of the carbon steel parts. It would be possible to make bearings with all stainless steel parts, but this would probably require re-tooling because the tooling for carbon steel materials cannot usually be used for stainless steel. In some cases, the parts would have to be redesigned. Because of the limited market for the product, the cost of the tooling would raise the price of the product to a prohibitive level. Also, the cost of the materials in an all stainless steel bearing would be substantial.

It is the object of this invention to provide a cartridge-type ball bearing with a plastic housing into which the outer raceways in the form of rings may be pressed and retained in position by means of annular grooves with sloping sidewalls cast into the inner surface of the plastic housing.

DETAILED DESCRIPTION OF A PREFERRED EMBODIMENT

Figure 1:
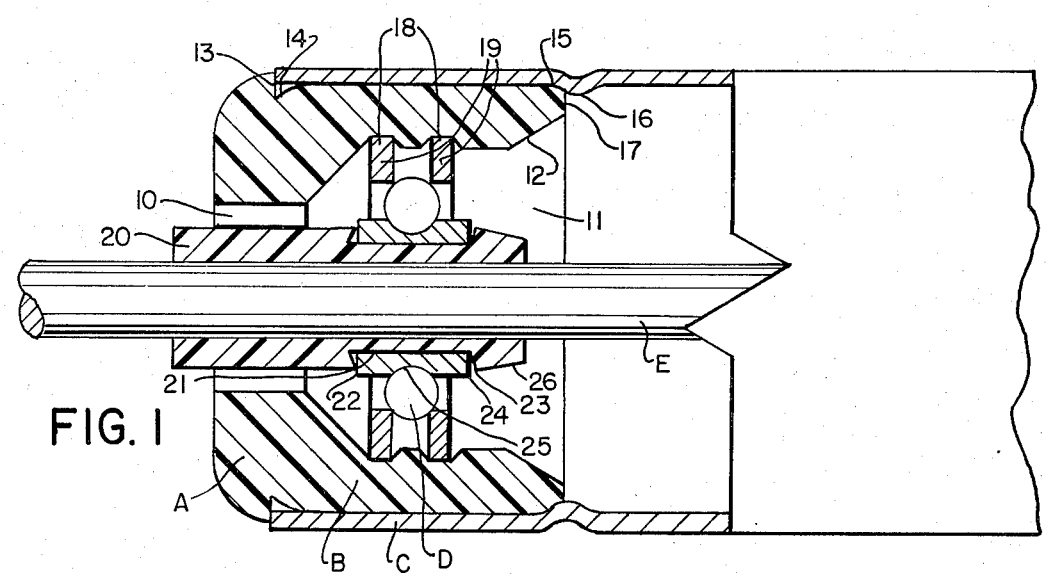
FIG. 1 is a cross section through the axis of rotation of the roller showing the bearing and a portion of the roller tube and axle.
Figure 2:
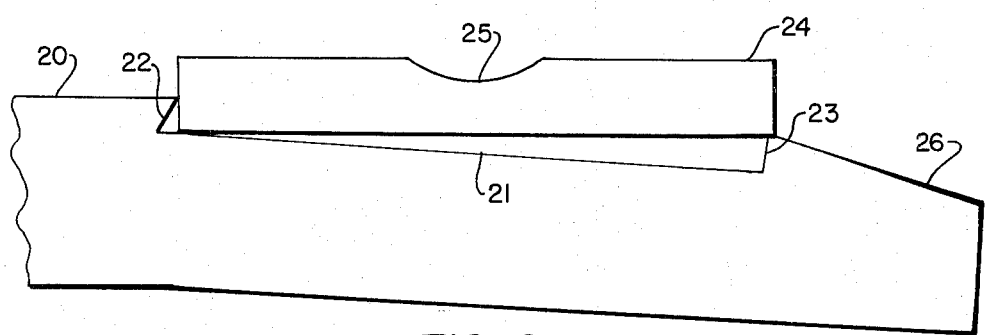
FIG. 2 is an enlarged cross section of the grooved portion of the bearing hub.

In a preferred embodiment of this invention, as shown in FIG. 1, the bearing consists of: a resilient plastic housing with inserted rings, preferably metallic, which serve as the outer raceway; a plastic hub with a sleeve, preferably metallic, containing an outer annular groove which serves as the inner raceway; and a full complement of balls, preferably metallic, between the two raceways.

The plastic housing is composed of a generally cylindrical main body A with a generally cylindrical flange or sleeve B extending to one side near the outer periphery of the main body so as to lie inside the end portion of an associated tubular roller C, the inside diameter of which may be slightly smaller than the outside diameter of sleeve B. At the end of the housing adjacent to the main body A is a circular aperture 10 and at the opposite end a larger circular aperture 11 with a conical taper 12 at the open end thereof. The taper of the entrance 12 to aperture 11 should be such that the rings inserted at the open end of the housing 11 can be pressed into seated position in grooves 18 without gouging or permanently deforming the housing; particles resulting from such gouging which would be forced ahead of the rings and deposited in the grooves would prevent the proper seating of the rings. At the end adjacent to aperture 10 there is preferably a shoulder 13 which extends radially outward to abut the end of roller C. The portion of the housing adjacent to the shoulder 13 has a curved annular cross recess or groove 14 so that, after the housing is inserted into the end of tube C, the end of the tube may be crimped or cupped to the approximate shape of the curved recess 14 thus locking the housing into the end of the tube. The outer end of sleeve B may preferably have a chamfer 15 to facilitate insertion of the housing into the tube, and the tube C preferably has an internal annular rib 16 abutting the end of the housing 17. This rib cooperates with the crimped end of the tube to restrain the housing from movement relative to the tube in a direction parallel to the axis of rotation. The rib 17 may be rolled into the tube simultaneous with the tube cut-off operation or may be a series of disconnected radially disposed projections.

On the inner surface of sleeve B there are annular grooves 18, in this embodiment two in number, into which washers or rings 19, preferably metallic, are inserted; the space between the rings constituting a groove which serves as the outer raceway. Rings may be of any desired cross-sectional shape, including circular, but grooves 18 should have sloping sidewalls so that rings can be pressed into the grooves without damaging or permanently distorting the plastic sidewalls. In a special case, the space between grooves 18 may be zero resulting in a single groove in which may be inserted a single ring, containing an internal annular groove, or a plurality of rings which abut one another to fill the groove, the internal profile of said rings being an annular groove which may serve as the outer racaeway.

The hub consists of a generally tubular plastic sleeve 20 with an outer annular groove near one end, said groove having a bottom 21 and side walls 22 and 23 both of which are truncated-cone shaped. Inserted in this groove is a tubular sleeve 24, preferably metallic, with an outer annular groove 25 which serves as the inner ball raceway. Plastic sleeve 20, which is slightly longer than the distance between the truncated cones formed by side wall 22 and 23 respectively, has an external connical taper 26 at the end nearest the groove to facilitate the pressing of sleeve 24 onto the hub. The inside diameter of sleeve 24 is approximately equal to the outside diameter of the grooved portion of sleeve 20, hence as the sleeve 24 is pressed onto the sleeve 20 from the tapered end, side wall 23 is compressed radially until sleeve 24 is fully seated against surface 21, whereupon side wall 23, due to the elasticity of the plastic material from which sleeve 20 is made, returns to its original shape and position thus locking sleeve 24 in its ultimate position. To accomplish this, side wall 22 must be compressed sufficiently to permit seating of sleeve 24, after which side walls 22 remains under compression exerting sufficient pressure against the end of sleeve 24 to prevent rotation of the sleeve under normal operating conditions.

A full complement of balls D of a diameter corresponding to groove 25 is inserted between the two raceways to complete the bearing.

Hub 20 may be bored to a desired diameter for a free fit over axle E.

Figure 3:
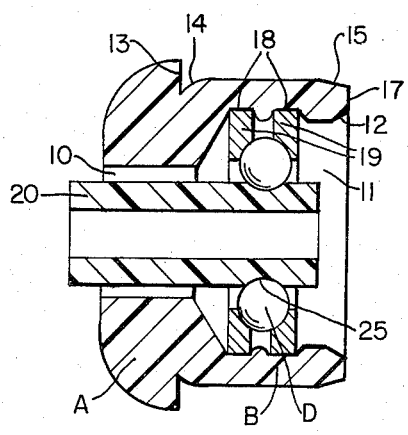
FIGS. 3, 4 and 5 are cross sectional views of various types of grooves in the housing sleeve with various shapes of rings inserted therein.
Figure 4:
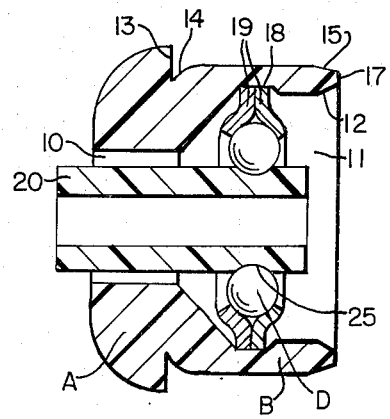
Figure 5:
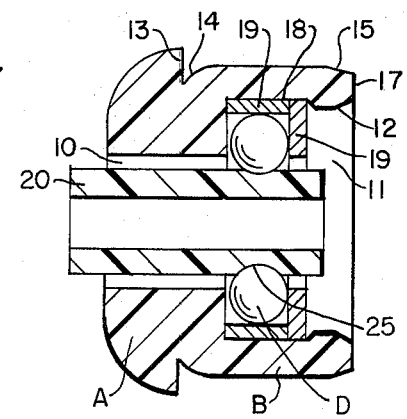

FIGS. 3, 4, and 5 show variations in the shapes of insert rings which are within the scope of this invention.

FIGS. 3, 4, and 5 shows a plastic housing A with a generally cylindrical flange or sleeve B extending to one side near the outer periphery of the main body. At the end of the housing adjacent to the main body A is a circular aperture 10 at the opposite end a larger circular aperture 11 with a conical taper 12 at the open end thereof. At the end adjacent to aperture 10 there is preferably a shoulder 13 which extends radially outward to abut the end of a cylindrical roller, not shown. The portion of the housing adjacent to the shoulder 13 has a curved annular recess or groove 14 so that after insertion of the housing into the end of a tube, the end of the tube may be crimped to the approximate shape of the curved recess to lock the housing into the end of the tube. The outer end of sleeve B may preferably have a chamfer 15 to facilitate the insertion of the housing into the end of a tube.

On the inner surface of sleeve B there are annular grooves 18 into which washers or rings 19 of various shapes are inserted. These rings serve as outer raceways and are preferably of metal or other hard material to provide free rolling surfaces for the balls D. Rings serve also to retain the balls.

Hubs 20 may be of any conventional design with an outer annular groove 25 which serves as the inner ball raceway.

Assembly is accomplished by first pressing one ring into the housing, next placing hub with sleeve inserted thereon in proper position, next inserting balls, and lastly pressing second ring into the housing.

The plastics used in the housing and hub may be Nylon, Delrin, Polyethylene or the like, depending upon cost and operational requirements of the bearing, and may be made by any method including machining or molding.

In this embodiment the outer raceway has been shown to consist of a plurality of outer rings and the inner raceway as a one-piece sleeve. It should be understood that conversely the outer raceway can be a single one-piece sleeve with the inner raceway made up of a plurality of rings.

ADVANTAGES OF DEVICES EMBODIED IN THIS INVENTION

A. Because the bearings are ultimately compressed between the annular ribs in the tube and the crimped ends, which causes the housing to expand radially, tube inside diameter is not critical and can be such that bearings can be easily inserted in the tubing.

B. Bearing raceway can be of any desired material, for example stainless steel, to resist wear and corrosion; and the plastic components can likewise be selected for desired physical and chemical properties.

C. Materials which might otherwise be prohibitively expensive can be used for raceways because the amount of such materials constitutes such a small percentage of the total in the bearing.

We claim:

1. A tubular roller with inserted ball bearings, said bearings including a plastic housing containing a conical opening at one end and at least one internal annular groove with inclined side walls into which groove a bearing outer raceway is pressed, said raceway consisting of at least one ring said ring forming at least a part of a groove which serves as said outer ball race way.

2. A tubular roller according to claim 1 further compresses a bearing hub consisting of a plastic sleeve with an external annular groove having sloping side walls, onto which an outer ring is pressed, said ring having an external annular groove, and said ring being retained firmly in placed by the sloping side walls of said annular groove in said plastic sleeve.

3. A cartridge-type ball bearing including a plastic housing containing a conical opening at one end and at least one internal annular groove with inclined side walls into which groove a bearing outer raceway is pressed, said raceway consisting of at least one ring, said ring forming at least a part of a groove which serves as said outer ball race way.

4. A cartridge type ball bearing according to claim 3 further comprises a bearing hub consisting of a plastic sleeve with an external annular groove, having sloping side walls, onto which an outer ring is pressed, said ring having an external annular groove, and said ring being retained firmly in place by the sloping side walls of said annular groove in said plastic sleeve.

* * * * *